(12) United States Patent  
Chen

(10) Patent No.: US 9,389,495 B2  
(45) Date of Patent: Jul. 12, 2016

(54) PROJECTION APPARATUS AND ELEVATING MECHANISM THEREOF

(71) Applicant: Yen-Wei Chen, Hsin-Chu (TW)

(72) Inventor: Yen-Wei Chen, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 85 days.

(21) Appl. No.: 14/248,872

(22) Filed: Apr. 9, 2014

(65) Prior Publication Data

US 2014/0300874 A1    Oct. 9, 2014

(30) Foreign Application Priority Data

Apr. 9, 2013  (CN) .......................... 2013 1 0120388

(51) Int. Cl.
| | |
|---|---|
| G03B 21/00 | (2006.01) |
| G03B 21/14 | (2006.01) |
| G03B 23/00 | (2006.01) |
| F16M 11/24 | (2006.01) |
| G03B 21/54 | (2006.01) |
| F16M 7/00 | (2006.01) |
| F16M 11/10 | (2006.01) |

(52) U.S. Cl.
CPC .............. *G03B 21/145* (2013.01); *F16M 7/00* (2013.01); *F16M 11/10* (2013.01); *F16M 11/24* (2013.01); *G03B 21/54* (2013.01); *G03B 23/00* (2013.01)

(58) Field of Classification Search
CPC ....... G03B 23/00; G03B 21/145; F16M 11/24
See application file for complete search history.

(56) References Cited

U.S. PATENT DOCUMENTS

| | | | |
|---|---|---|---|
| 3,748,135 A | | 7/1973 | Owen, Jr. |
| 5,855,278 A | * | 1/1999 | Harfst ........................... 206/576 |
| 6,302,543 B1 | * | 10/2001 | Arai et al. ........................ 353/70 |
| 6,461,002 B1 | | 10/2002 | Su |
| 6,481,855 B2 | * | 11/2002 | Oehler ........................... 353/70 |
| 6,685,149 B1 | * | 2/2004 | Chang .................... G03B 23/00 |
| | | | 248/157 |
| 6,793,348 B2 | * | 9/2004 | Lee et al. ....................... 353/119 |
| 2003/0106972 A1 | * | 6/2003 | Hsu et al. ................... 248/188.2 |
| 2003/0227601 A1 | * | 12/2003 | Chang ........................... 353/119 |

(Continued)

FOREIGN PATENT DOCUMENTS

| | | |
|---|---|---|
| CN | 102478755 A | 5/2012 |
| JP | 52056846 Y1 | 12/1977 |
| TW | 200513780 A | 4/2005 |
| TW | I232344 | 5/2005 |

(Continued)

OTHER PUBLICATIONS

Chinese Office Action of application No. 201310120388.4 dated Jun. 30, 2015 (pp. 1-5).

*Primary Examiner* — Sultan Chowdhury  
*Assistant Examiner* — Magda Cruz  
(74) *Attorney, Agent, or Firm* — Muncy, Geissler, Olds & Lowe, P.C.

(57) ABSTRACT

An elevating mechanism of a projection apparatus includes a housing, a guide slot, an adjustable foot mount, at least one resilient member, and a sliding arm. The guide slot is formed on a surface of the housing and having multiple sections to form a sliding path. At least one section has multiple teeth, and a recess is formed between each two adjacent teeth. The sliding arm has a fixed end and a free end, the fixed end is fixed on the adjustable foot mount, and the free end is slidably coupled to the guide slot. When the sliding arm slides on the section having the teeth, the free end of the sliding arm engages with any of the recesses to hold the adjustable foot mount at a selected position.

10 Claims, 9 Drawing Sheets

(56) References Cited

U.S. PATENT DOCUMENTS

2006/0202095 A1* 9/2006 Shao et al. .............. 248/188.2
2011/0013154 A1 1/2011 Chou
2011/0058317 A1 3/2011 Oota

FOREIGN PATENT DOCUMENTS

| TW | 200609644 A | 3/2006 |
| TW | 200617577 A | 6/2006 |
| TW | 200626044 A | 7/2006 |

* cited by examiner

PROJECTION APPARATUS AND ELEVATING MECHANISM THEREOF

BACKGROUND OF THE INVENTION a. Field of the Invention

The invention relates to an elevating mechanism, and more particularly, to an elevating mechanism used in a projection apparatus.

b. Description of the Related Art

FIG. 1 shows a conventional height-adjusting device 100 for adjusting the height of a projection apparatus. As shown in FIG. 1, the height-adjusting device 100 includes a connection part 101, a leg 107, a push button 109, and a resilient member 111. The connection part 101 includes a groove 103 and a rack 105, and the push button 109 is disposed outside a housing of the projection apparatus 100 to be pushed inwardly by a user. When a user presses the push button 109, the push button 109 forces the leg 107 to slide along the groove 103, and meanwhile a protrusion part 115 of the leg 107 leans against the resilient member 111 to deform the resilient member 111 and enable the resilient member 111 to move along the rack 105. When the push button 109 is not pressed, the leg 107 is held in position through the engagement of the resilient member 111 and the rack 105. Therefore, the height of a projection apparatus is allowed to be adjusted.

Taiwan patent No. I232344 discloses an adjustable support stand for a projection apparatus, where a ratchet with multiple teeth is disposed inside a ratchet casing. When the ratchet sticks out from the ratchet casing, a pawl may engage with one corresponding tooth of the ratchet to adjust the height of the support stand. U.S. Pat. No. 5,855,278 discloses a lift device having a cylinder and a coupling cover. The cylinder has a heart-shaped guide groove, and an engagement end of the coupling cover uni-directionally slides along different sections of the heart-shaped guide groove.

BRIEF SUMMARY OF THE INVENTION

The invention provides an elevating mechanism of a projection apparatus. The elevating mechanism has at least one of the advantages of rapid storage, small occupied space, and finely-tuned height adjustment.

Other objects and advantages of the invention may be further illustrated by the technical features broadly embodied and described as follows.

In order to achieve one or a portion of or all of the objects or other objects, one embodiment of the invention provides an elevating mechanism of a projection apparatus including a housing, a guide slot, an adjustable foot mount, at least one resilient member, and a sliding arm. The housing is attached to the inside of the projection apparatus, and the guide slot is formed on a surface of the housing and has a plurality of sections to form a sliding path. Each two adjacent sections are connected and make an included angle with each other, at least one of the sections has multiple teeth, and a recess is formed between each two adjacent teeth. The adjustable foot mount slides relative to the housing, and at least one resilient member is disposed inside the housing and leans against the adjustable foot mount. The sliding arm has a fixed end and a free end, the fixed end is fixed on the adjustable foot mount, and the free end is slidably coupled to the guide slot and moves along the sliding path to store the adjustable foot mount inside the housing or release the adjustable foot mount from the housing. When the free end of the sliding arm slides on the section having the teeth, the free end of the sliding arm engages with any of the recesses to hold the adjustable foot mount at a selected position.

In one embodiment, a length of the section having the teeth is larger than a length of any other section without the teeth.

In one embodiment, the sliding arm is made of an elastic material, and the resilient member includes at least one spring.

In one embodiment, the guide slot is a cam device.

In one embodiment, all the sections together form a closed path, the free end of the sliding arm slides along the closed path, and the closed path has a plurality of turning points.

In one embodiment, the adjustable foot mount has at least one through hole, and the fixed end of the sliding arm is inserted into the through hole.

In one embodiment, at least one notch is formed on one side of the adjustable foot mount, one end of the resilient member leans against the housing, and another end of the resilient member is inserted into the notch.

Another embodiment of the invention provides a projection apparatus having a projection lens for projecting at least one image and an elevating mechanism. The elevating mechanism includes a housing, a guide slot, an adjustable foot mount, at least one resilient member, and a sliding arm. The housing is attached to the inside of the projection apparatus, and the guide slot is formed on a surface of the housing and having a plurality of sections. Each two adjacent sections are connected and make an included angle with each other to form a closed path, at least one of the sections has multiple teeth, and a recess is formed between each two adjacent teeth. The adjustable foot mount slides relative to the housing, and at least one resilient member is disposed inside the housing and leans against the adjustable foot mount. The sliding arm has a fixed end and a free end, the fixed end is fixed on the adjustable foot mount, and the free end is slidably coupled to the guide slot and moves along the closed path to store the adjustable foot mount inside the housing or release the adjustable foot mount from the housing. When the sliding arm slides on the section having the teeth, the free end of the sliding arm engages with any of the recesses to allow the projection lens to have a selected height.

According to the above embodiments, the elevating mechanism uses a push-push mechanism to allow the adjustable foot mount to be quickly stored inside the housing or released to a predetermined position. Therefore, the storage and release of an adjustable foot mount is achieved by directly pushing the adjustable foot mount without the need of an additional button. Under the circumstance, the elevating mechanism may occupy a smaller space and thus allows for more limited room. Besides, since at least one section is spread with multiple teeth, the adjustable foot mount may stay at any of the positioning points formed by the notches to be fixed at a desired position. Accordingly, the height of a projection lens of a projection apparatus is allowed to be accurately and finely adjusted to a desired value.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
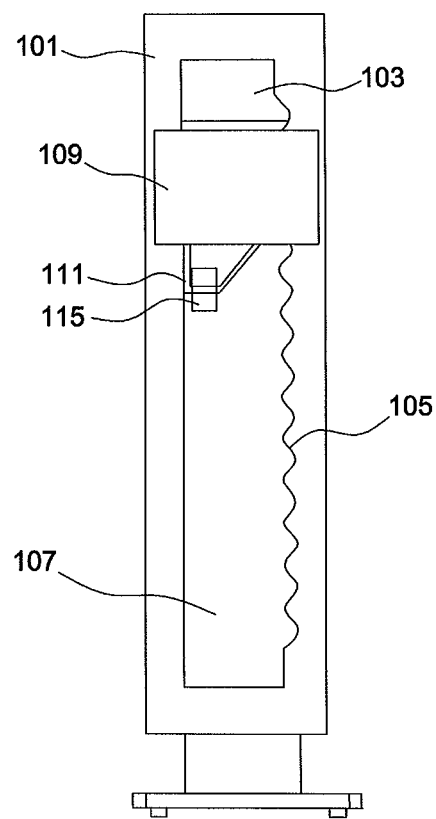
FIG. 1 shows a conventional height-adjusting device for adjusting the height of a projection apparatus.
Figure 2:
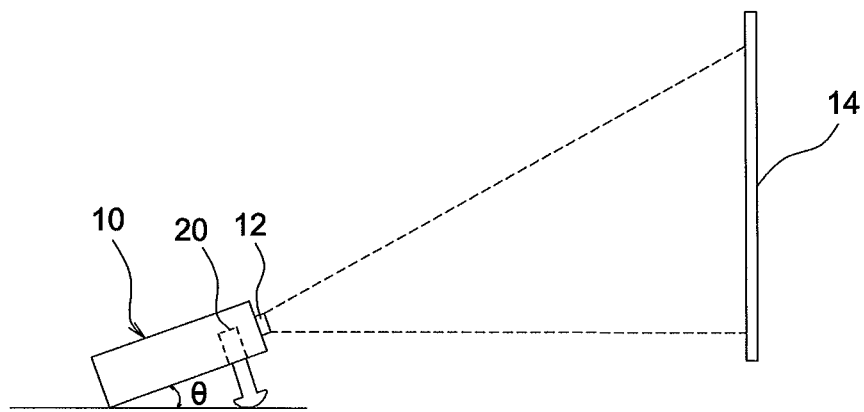
FIG. 2 shows a schematic diagram of a projection apparatus according to an embodiment of the invention.
Figure 3:
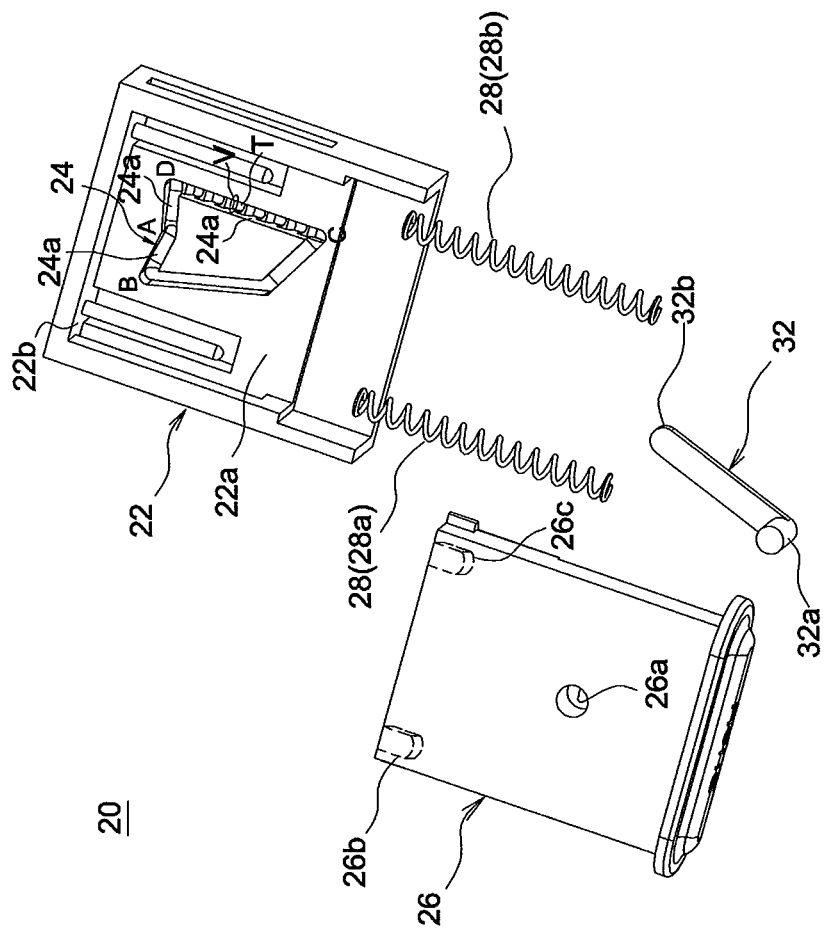
FIG. 3 shows an exploded diagram of an elevating mechanism according to an embodiment of the invention.

FIG. 2 shows a schematic diagram of a projection apparatus according to an embodiment of the invention. Referring to FIG. 2, typically, in order to adjust a position of a projected image of a projection apparatus 10, designers commonly equip the projection apparatus 10 with an elevating mechanism 20, and the elevating mechanism 20 and a projection lens 12 may be disposed on the same side of the projection apparatus 10. By adjusting an elevation angle θ of the projection apparatus 10 (namely the height of a front end of the projection apparatus 10) through the elevating mechanism 20, the height of the image projected from the projection lens 12 is adjusted to ensure that the projected image is in a proper position on the screen 14. FIG. 3 shows an exploded diagram of an elevating mechanism according to an embodiment of the invention. As shown in FIG. 3, the elevating mechanism 20 includes a housing 22, a guide slot 24, an adjustable foot mount 26, at least one resilient member 28 and a sliding arm 32. The housing 22 is attached to a part of the bottom of the projection apparatus 10 and disposed inside the projection apparatus 10 shown in FIG. 2. The adjustable foot mount 26 may slide relative to the housing 22 and may be stored inside the projection apparatus 10. The guide slot 24 is formed on a surface 22a of the housing 22, and the guide slot 24 may include multiple sections 24a that together form a closed loop serving as a sliding path, where any two adjacent sections 24a are connected with each other at the end and form an included angle with each other. In this embodiment, the closed sliding path constructed by the sections 24a has multiple turning points A, B, C and D. The at least one resilient member 28 is disposed inside the housing 22 and leans against the adjustable foot mount 26. In this embodiment, a through hole 26a is formed in a central portion of the adjustable foot mount 26, and two notches 26b and 26c are formed on one end of the adjustable foot mount 26. The at least one resilient member 28 may be two springs 28a and 28b. During assembly, the springs 28a and 28b are respectively disposed on two sides of the guide slot 24. Each of the springs 28a and 28b leans against a surface 22b of the housing 22 at one end, another end of the spring 28a is inserted into the notch 26b of the adjustable foot mount 26, and another end of the spring 28b is inserted into the notch 26c of the adjustable foot mount 26. The sliding arm 32 has a fixed end 32a and a free end 32b, the fixed end 32a is inserted in the through hole 26a of the adjustable foot mount 26 to be fixed on the adjustable foot mount 26, and the free end 32b is slidably coupled to the guide slot 24 and circles over the closed sliding path constructed by the sections 24a. In this embodiment, at least one of the sections 24a (for example, the section 24a between the turning point C and the turning point D shown in FIG. 3) has multiple teeth T, and a recess V is formed between two adjacent teeth T. The recess V may be V shaped. In one embodiment, the free end 32b of the sliding arm 32 has a protrusion to engage with any recess V formed between two adjacent teeth T.

Figure 4A:
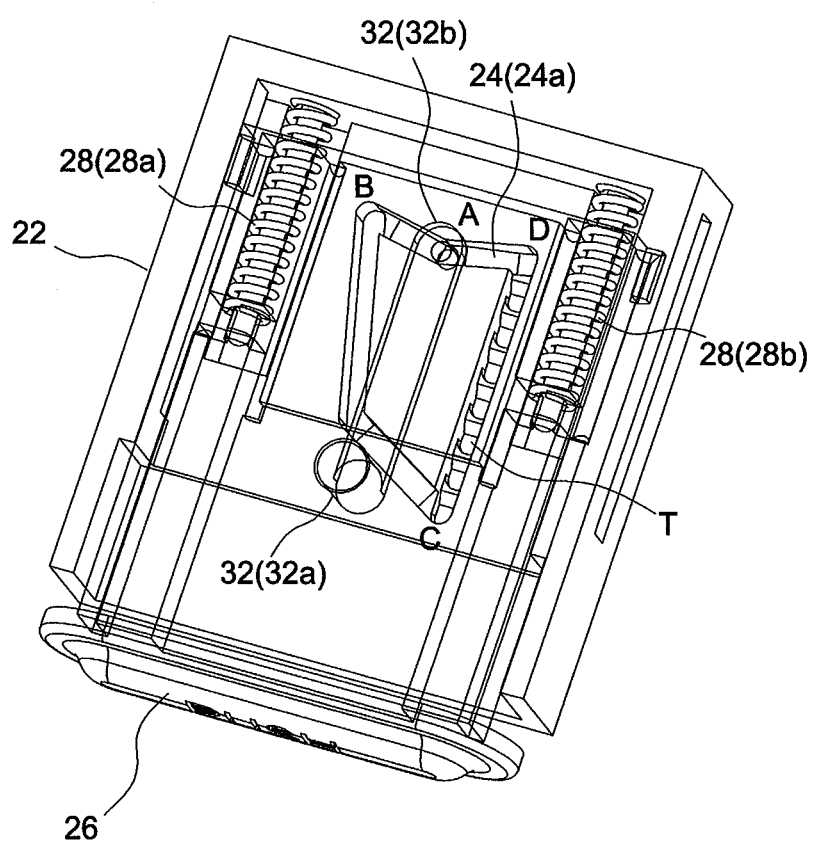
FIG. 4A to FIG. 4E illustrate operations of the elevating mechanism shown in FIG. 3.
Figure 4B:
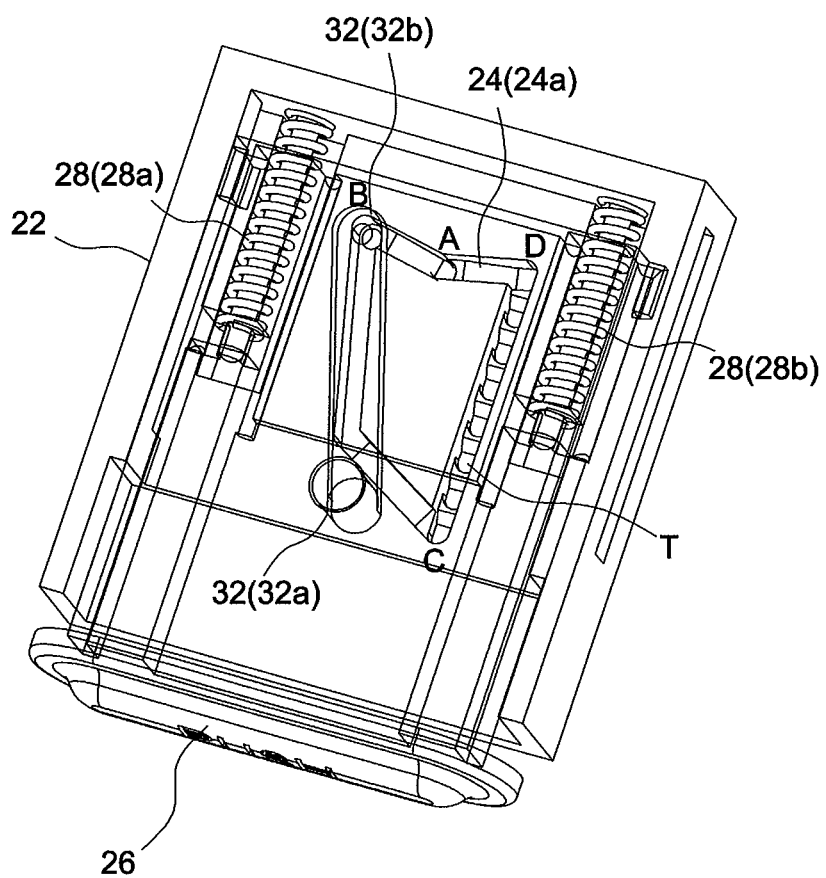
Figure 4C:
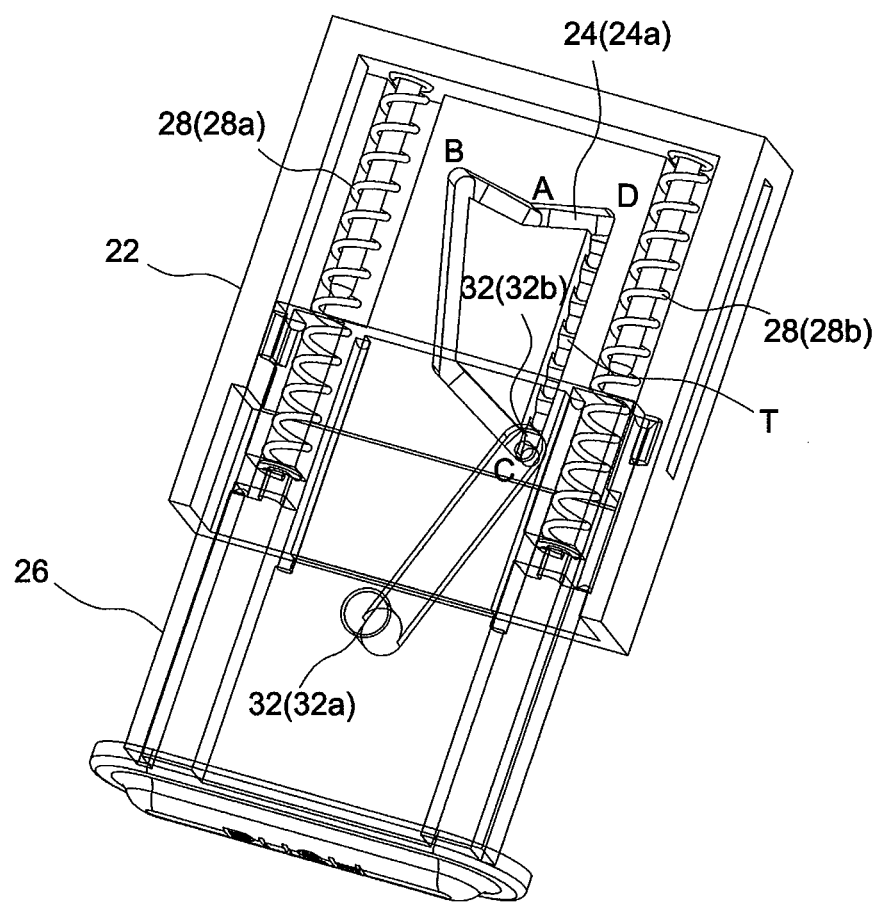
Figure 4D:
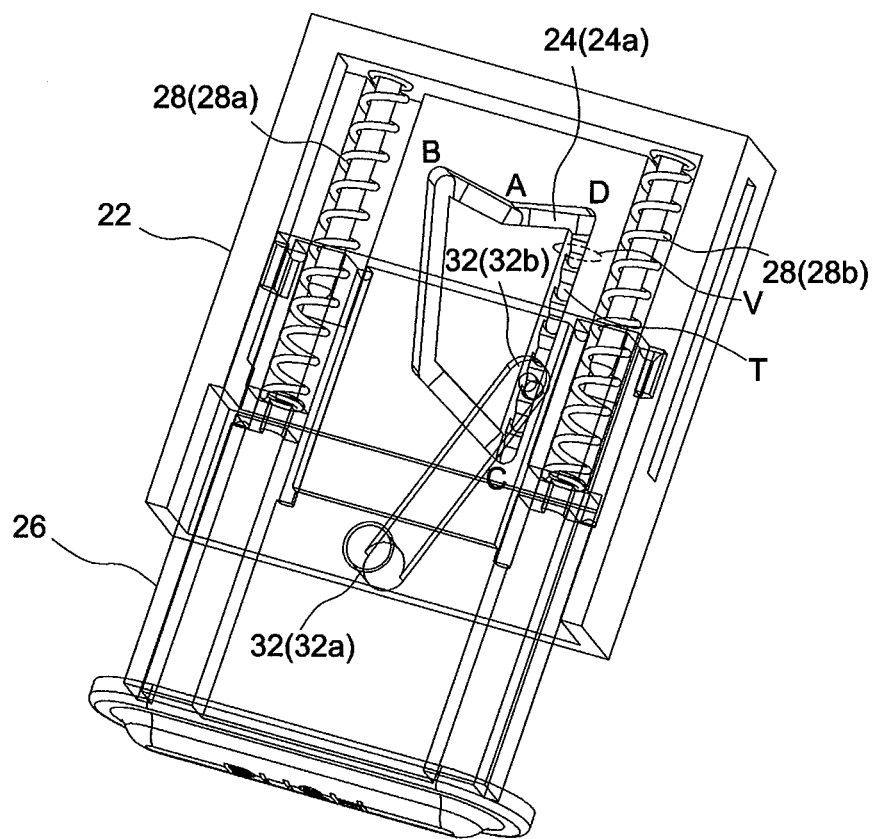
Figure 4E:
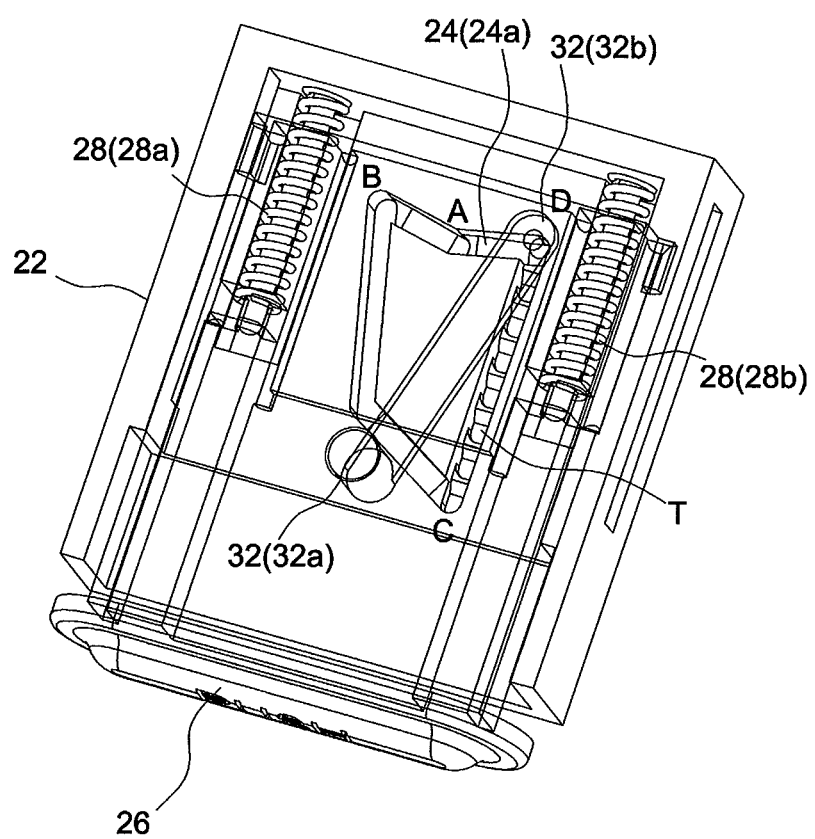
Figure 5:
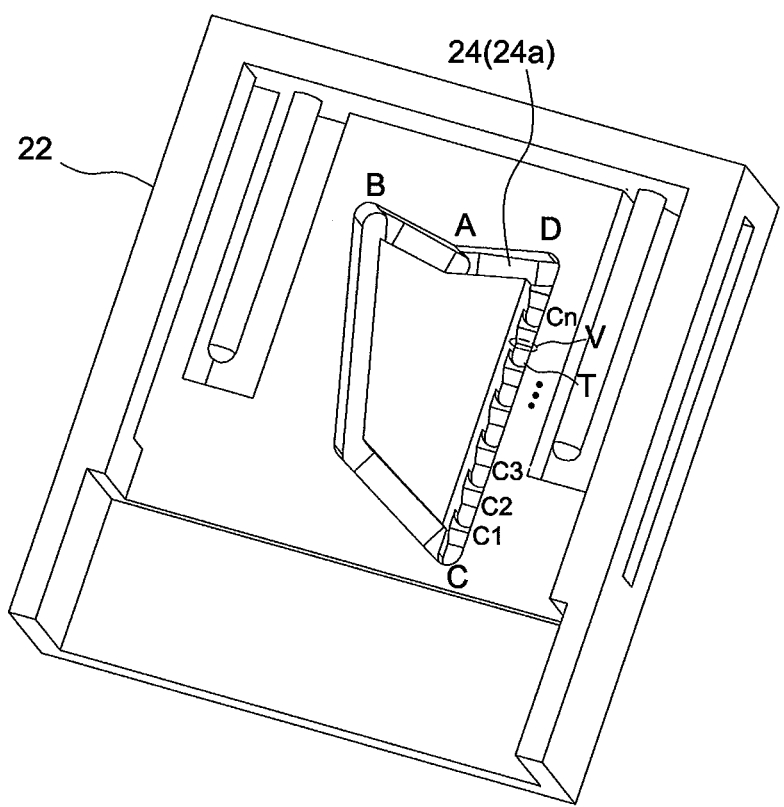
FIG. 5 shows an schematic diagram illustrating positioning points formed by recesses between two adjacent teeth according to an embodiment of the invention.

FIG. 4A to FIG. 4E illustrate operations of the elevating mechanism shown in FIG. 3, where variations in the position of the sliding arm 32 moving in the guide slot 24 and the variations of the distance between the housing 22 and the adjusting foot mount 26 driven by the sliding arm 32 are clearly shown. In the assembled elevating mechanism 20 shown in FIG. 4A, the free end 32b of the sliding arm 32 moves to the turning point A of the guide slot 24 when the adjustable foot mount 26 is pushed to be stored inside the housing 22 by an user, and meanwhile the resilient members 28 are compressed by the corresponding notches 26b and 26c of the adjustable foot mount 26 and the wall surface 22b of the housing 22. Since the point A is a turning point formed between two adjoining inclined sections 24a and located in a lowest position across the two adjoining sections 24a, the free end 32b of the sliding arm 32 may stay at the point A in the closed path, without moving forwards or backwards, to hold the adjustable foot mount 26 inside the housing 22 in position. As shown in FIG. 4B, when the user pushes the adjustable foot mount 26 again, the sliding arm 32 is forced to be bent and deformed. The resilient members 28 are compressed by the corresponding notches 26b and 26c of the adjustable foot mount 26 to allow the free end 32b of the sliding arm 32 to bound towards the turning point B of the guide slot 24 (FIG. 4B) and then slide to arrive at the turning point C of the closed path (FIG. 4C). At the same time, elastic forces of the resilient members 28 exert on the notches 26b and 26c of the adjustable foot mount 26 to allow the adjustable foot mount 26 to be quickly released from the housing 22. As shown in FIG. 4C, since the resilient members 28 are in a compression state and the turning point C is located in a lowest position across two adjoining inclined sections 24a, the released adjustable foot mount 26 is allowed to be held in position. In other words, the guide slot 24 may function as a cam device and cooperate with the sliding arm 32 to form a push-push mechanism. Under the circumstance, the adjustable foot mount 26 is allowed to be quickly inserted inside the housing 22 or released from the housing 22 to a predetermined position. Next, as shown in FIG. 4D, when the adjustable foot mount 26 released from the housing 22 is pushed by the user again, the free end 32b of the sliding arm 32 may continually slide on the section 24a between the point C and the point D. In this embodiment, the section 24a between the point C and the point D is spread with multiple teeth T, the recess V is formed between each two adjacent teeth T, and each tooth T has an inclined plane (not numbered) raised gradually from the point C towards the point D. When the free end 32b of the sliding arm 32 slides along the section 24a between the point C and the point D of the sliding slot 24, the sliding arm 32 is pressed by the inclined plane of each tooth T to deform and moves until the free end 32b engages with the corresponding recess V between two adjacent teeth T. Then, when the adjustable foot mount 26 is pushed again, the free end 32b of the sliding arm 32 is guided by the inclined plane of the next tooth T to engage with the next recess V. Therefore, as shown in FIG. 5, the recesses V, each of which is positioned between two adjacent teeth T, form multiple positioning points C1, C2, . . . , Cn. Since the free end 32b of the sliding arm 32 may continuously stay at one of the positioning points C1, C2, . . . , Cn, a pushed-back distance of the adjustable foot mount 26 relative to the housing 22 is allowed to be finely tuned to hold the adjustable foot mount 26 at different heights in accordance with the engagement between the free end 32b and the corresponding recess V. Under the circumstance, the height of the image projected from the projection lens 12 of the projection apparatus 10 shown in FIG. 2 is allowed to be accurately and finely adjusted to a desired value. Finally, as shown in FIG. 4E, when the user pushes the adjustable foot mount 26 again, the sliding arm 32 at the turning point D is forced to be bent and deform to slide towards the turning point A and then stay at the turning point A, thus completing a circle of the closed path and storing the entire adjustable foot mount 26 inside the housing 22 as well as the projection apparatus 10.

In one embodiment, a length of the section 24a between the point C and the point D with the teeth T may be larger than a length of any other section 24a without the teeth T. Besides, the sliding arm 32 may be made of an elastic material to facilitate bending and deformation upon the sliding movement.

According to the above embodiments, the elevating mechanism 20 uses a push-push mechanism to allow the adjustable foot mount 26 to be quickly inserted inside the housing for storage or released from the housing 22 to a predetermined position. Therefore, the storage and release of an adjustable foot mount 26 are achieved by directly pushing the adjustable foot mount 26 without the need of an additional button. Under the circumstance, the elevating mechanism 20 may occupy a smaller space and thus allows for more limited room. Besides, since at least one section 24a is spread with multiple teeth T, the adjustable foot mount 26 may stay at any of the positioning points formed by the recesses V to be held at a selected position according to the engagement between the free end 32b of the sliding arm 32 and the corresponding recess V. Accordingly, the height of the image projected from a projection lens of a projection apparatus is allowed to be accurately and finely adjusted to a desired value. Further, the number and size of each tooth are not limited and may be determined according to selected fine-tuning intervals of height.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An elevating mechanism of a projection apparatus, comprising:
    a housing attached to the inside of the projection apparatus;
    a guide slot formed on a surface of the housing and having a plurality of sections to form a sliding path, wherein each two adjacent sections are connected and make an included angle with each other, at least one of the sections has multiple teeth, and a recess is formed between each two adjacent teeth;
    an adjustable foot mount sliding relative to the housing;
    at least one resilient member disposed inside the housing and leaning against the adjustable foot mount; and
    a sliding arm having a fixed end and a free end, the fixed end being fixed on the adjustable foot mount, and the free end being slidably coupled to the guide slot and moving along the sliding path to store the adjustable foot mount inside the housing or release the adjustable foot mount from the housing, wherein, when the sliding arm slides on the section having the teeth and is pressed by the teeth to deform, the free end of the sliding arm engages with any of the recesses to hold the adjustable foot mount at a selected position.

2. The elevating mechanism of the projection apparatus as claimed in claim 1, wherein a length of the section having the teeth is larger than a length of any other section without the teeth.

3. The elevating mechanism of the projection apparatus as claimed in claim 1, wherein the sliding arm is made of an elastic material.

4. The elevating mechanism of the projection apparatus as claimed in claim 1, wherein the guide slot is a cam device.

5. The elevating mechanism of the projection apparatus as claimed in claim 1, wherein the resilient member comprises at least one spring.

6. The elevating mechanism of the projection apparatus as claimed in claim 1, wherein all the sections together form a closed path, and the free end of the sliding arm slides along the closed path.

7. The elevating mechanism of the projection apparatus as claimed in claim 6, wherein the closed path has a plurality of turning points.

8. The elevating mechanism of the projection apparatus as claimed in claim 1, wherein the adjustable foot mount has at least one through hole, and the fixed end of the sliding arm is inserted into the through hole.

9. The elevating mechanism of the projection apparatus as claimed in claim 1, wherein at least one notch is formed on one side of the adjustable foot mount, one end of the resilient member leans against the housing, and another end of the resilient member is inserted into the notch.

10. A projection apparatus, comprising:
a projection lens for projecting an image; and
an elevating mechanism, wherein the elevating mechanism and the projection lens are disposed on the same side of the projection apparatus, and the elevating mechanism comprises:
a housing attached to the projection apparatus;
a guide slot formed on a surface of the housing and having a plurality of sections, wherein each two adjacent sections are connected and make an included angle with each other to form a closed path, at least one of the sections has multiple teeth, and a recess is formed between each two adjacent teeth;
an adjustable foot mount sliding relative to the housing;
at least one resilient member disposed inside the housing and leaning against the adjustable foot mount; and
a sliding arm having a fixed end and a free end, the fixed end being fixed on the adjustable foot mount, and the free end being slidably coupled to the guide slot and moving along the closed path to store the adjustable foot mount inside the housing or release the adjustable foot mount from the housing, wherein, when the sliding arm slides on the section having the teeth and is pressed by the teeth to deform, the free end of the sliding arm engages with any of the recesses to allow the projection lens to have a selected height.

* * * * *